United States Patent [19]

Skinner

[11] Patent Number: 4,788,411

[45] Date of Patent: Nov. 29, 1988

[54] WELDING METHOD WHICH PROVIDES A WELD WITH CORROSION PROTECTION

[75] Inventor: Mark C. Skinner, Afton, Minn.

[73] Assignee: Minnesota Mining and Manufacturing Company, St. Paul, Minn.

[21] Appl. No.: 62,840

[22] Filed: Jun. 16, 1987

[51] Int. Cl.$^4$ .............................................. B23K 35/34
[52] U.S. Cl. ................................ 219/127; 219/137 R; 219/91.21
[58] Field of Search ................ 219/127, 137 R, 91.2, 219/91.21

[56] References Cited

U.S. PATENT DOCUMENTS 4,417,007  11/1983  Salensky ............................. 523/442

FOREIGN PATENT DOCUMENTS 2037116  2/1972  Fed. Rep. of Germany ...... 219/127

OTHER PUBLICATIONS

Hackman, R. L. "Consumable-Electrode Inert-Arc Spot Welding" *The Welding Journal*, Sep. 1955, pp. 839–844.

McFall, S. Eric, "Spot Welding of Aluminum," *Welding Journal*, Dec. 1960, pp. 1230–1236.

*Primary Examiner*—E. A. Goldberg
*Assistant Examiner*—Teresa J. Walberg
*Attorney, Agent, or Firm*—Donald M. Sell; Richard Francis

[57] ABSTRACT

A welding method for metal parts includes preparing the surface areas of the parts to be welded to provide bare metal surfaces which are clean and dry, clamping said parts together, coating the bare metal surface with a liquid coating comprised of zinc dust, manganomanganic oxide fume, and organic binder, permitting the coating to dry, and welding the coated surfaces together by gas metal arc welding.

4 Claims, No Drawings

WELDING METHOD WHICH PROVIDES A WELD WITH CORROSION PROTECTION

TECHNICAL FIELD

This invention relates to a method for welding together metal parts, and more specifically a method for welding which results in a welded joint which is protected against corrosion.

BACKGROUND ART

The technology of surface finishing has yielded many effective coatings which are well known to those skilled in the art. The use of zinc-rich coatings has found wide acceptance for mill application on metal (e.g., steel) coil. These coatings usually perform adequately until the coated surface is damaged, which typically causes a portion of the protective coating to be removed from the protected surface, making it vulnerable to corrosion. Restoration of corrosion protection to the damaged site must then be undertaken. The subsequent application of a zinc-rich coating is a recognized way to renew the corrosion protection of a damaged metal surface.

Zinc-rich coatings are applied to steel surfaces to provide galvanic and sacrificial protection. These coatings are desired because they are very effective, even in chemical environments. The zinc will be chemically used up or dissipated before the steel is attacked. Zinc-rich coatings also tend to self-heal, frequently preventing the spread of subsequent corrosion or rust.

Organic zinc-rich coatings have been used as weld-through coatings for many years. These coatings typically contain a minimum of 80 weight percent zinc pigment in a film-forming binder. Such a zinc loading is necessary to ensure the electrical conductivity of the coating. However, when the zinc-rich coating is subsequently subjected to high temperatures, e.g., during welding, the zinc-rich coating is usually vaporized with an attendent loss of the protection afforded by the zinc.

The present preferred method of welding in automotive body shops is gas metal arc welding because it offers more versatility than the other welding methods. Gas metal arc welding, which is often called MIG (metal inert gas) welding, is an arc welding process in which the heat for welding is generated by an arc between a consumable electrode and the work metal. The electrode, a bare solid wire that is continuously fed to the weld area, becomes the filler metal as it is consumed. The electrode, weld pool, arc, and adjacent areas of the base metal are protected from atmospheric contamination by a gaseous shield provided by a stream of inert gas, or mixture of gases, fed through the welding gun. The gas shield must provide full protection because even a small amount of entrained air can contaminate the weld deposit.

Difficulties arise in the welding of steels that are coated with low melting point metals such as zinc, as in a zinc-rich coating. These coated surfaces are difficult or impossible to weld satisfactorily because the welding heat causes fuming of the coating or alloying with the base metal, or both. This results in welds with poor mechanical strength or environmental resistant properties. When coated metals are to be welded, the coating is then usually first thoroughly removed from the joint areas. Post weld repair of the coating over the weld area is then required to afford corrosion protection. Application of an anti-corrosion coating to the overlap area of the welded lap joint to provide adequate corrosion protection is very difficult to achieve.

U.S. Pat. No. 4,417,007 assigned to the Elkem Metals Co. of Pittsburgh, Pa., discloses the use of manganomanganic oxide fume pigment in a zinc-rich paint formulation which substantially improves the corrosion resistant properties of these zinc-rich paints. This coating merely acts as a protective coating—not as a weld-through coating.

SUMMARY OF THE INVENTION

The invention provides a method to weld a steel lap joint which produces a weld which is not susceptible to corrosion. Corrosion protection is provided by applying the zinc-rich anti-corrosion coating which contains manganomanganic oxide to the mating surfaces of the parts to be joined prior to welding. The coating is then welded-through during welding, surprisingly leaving intact a protective coating in the welded area to provide corrosion protection.

Specifically, the method comprises removing the coating from the area to be welded to provide a bare metal surface which is clean and dry, coating the surfaces to be joined (e.g., by brushing or spraying) with a zinc-rich coating which contains manganomanganic oxide, permitting the coating to dry at least to the touch, and welding the joined surfaces together by means of gas metal arc welding. The joint may then be dressed as required, and several, e.g., three or four coats, of the zinc-rich coatings applied. When dry, the repaired area may then be coated in the conventional way using a primer and color coat directly on the zinc-rich coating.

The zinc-rich coating comprises from about 8 to about 90 (preferably 8-45) parts by weight zinc dust pigment, from about 3 to about 55 (preferably 3 to 40) parts by weight percent manganomanganic oxide fume, from about 2 to about 30 (preferably 2 to 25) parts by weight organic binder, sufficient solvents for convenient application, and other optional ingredients such as other pigments and suspending agents.

DETAILED DESCRIPTION OF THE INVENTION

Zinc rich paints are composed of a binder to which zinc dust is added as a pigment. The concentration of zinc in a solvent free binder is generally in excess of 80% by weight to provide adequate electrical conductivity in the coating.

When the amount of zinc pigment exceeds about 45% by weight some loss of weldability may be noted and above about 90% zinc there may be a loss of coating integrity and adhesion. The coating is prepared by mixing zinc dust, manganomanganic oxide fume, and a resin binder together with optional pigments, solvent and other known ingredients such as dispersants, stabilizers, etc. The optional pigments preferably enhance corrosion resistance as well as produce a distinctive and pleasant color when added to paint formulations either alone or together with other pigments.

The pigments should have a very finely-divided particle size, generally less than about ten microns. The fine particles enhance the ability of the pigments to be easily dispersed throughout the paint mixture during processing and further assure that the paint can be evenly distributed in a thin layer upon application to a surface without any streaks or other imperfections and thus provide uniform corrosion protection.

A coating formulation useful for the practice of the present invention comprising zinc dust, manganomanganic oxide fume ($Mn_3O_4$), and binder is disclosed in U.S. Pat. No. 4,417,007, the disclosure of which patent is incorporated herein by reference. The $Mn_3O_4$ fume acts as a color pigment to provide a deep reddish-brown color which is similar to, but yet readily distinguishable from, the brown color pigmentation produced by synthetic iron oxide pigments, e.g., yellow, tan or red iron oxide pigments, and has a very fine particle size on the order of about 10 microns which enables the pigment to be uniformly distributed throughout the entire paint composition.

The $Mn_3O_4$ fume may be prepared by passing a stream of oxygen through or across the surface of a molten bath of ferro-manganese. The terms $Mn_3O_4$ fume and manganomanganic oxide fume used herein mean the finely divided spherical particles of fume recovered from the oxygen blowing of molten ferro-manganese as described above.

Zinc dust is very finely-divided zinc particles having an average particle size preferably of between about 2 and 40 microns. The coating formulation to be used in the practice of the present invention can be prepared using most any commercial grade zinc dust such as Zinc Dust L-15 produced by Federated Metals. This material has an average particle size of about 5 microns.

The mixture of zinc dust and manganomanganic oxide fume in a finely-divided or a comminuted state produces coatings which when coated on metal substrates have corrosion resistant properties which are superior to similar coatings made solely with $Mn_3O_4$ fume or zinc pigments. The amount of corrosion protection afforded by the paint formulation is dependent upon the manganomanganic oxide fume-zinc ratio.

The $Mn_3O_4$ fume pigment is preferably in a range of particle sizes comparable with the finely-divided particle size of conventional paint pigments to enhance suspension and enable the pigment to be uniformly distributed throughout the entire paint composition.

As indicated, the pigment used in the zinc-rich coating composition is composed of manganomanganic oxide fume or may be a material containing predominantly manganomanganic oxide fume, i.e., greater than about 50% by weight. The $Mn_3O_4$ fume should have a particle size such that about 98% of the particles are less than 10 microns. Typically, $Mn_3O_4$ fume that is recovered from electrometallurgical furnaces by conventional methods may contain about 1.0 to 2.0% particles of a size greater than about 10 microns. Accordingly, it may be desirable or even necessary in some cases to eliminate these large diameter particles from the $Mn_3O_4$ fume. This may be done, e.g., by conventional classification techniques or by impact methods such as ball milling, manganomanganic oxide fume which has been classified or milled to a particle size wherein about 98% of the particles are less than 10 microns can be readily dispersed in the paint formulation with medium shear equipment, such as by use of a Cowles Dissolver.

Typical coating formulations containing a $Mn_3O_4$ fume and zinc dust for use in the practice of the present invention are represented by the following:

| Ingredients | Typical (parts by wt.) | Preferred (parts by wt.) |
| --- | --- | --- |
| A. Resin binder | 2–30 | 2–25 |
| B. Zinc dust | 8–90 | 8–45 |
| C. $Mn_3O_4$ pigment fume | 3–55 | 3–40 |
| D. Other pigments including pigment extenders, fillers etc. | 0–35 | 1–15 |
| E. Pigment suspension agent | 0–5 | 0.5–3 |
| F. Solvent | * | * |

*As required for proper application viscosity.

The coating formulation can be prepared by conventional methods well known in the prior art. For example, the coating formulation can be prepared by mixing the resin binder together with the $Mn_3O_4$ fume, zinc dust, other pigments and pigment suspension agents and solvent. Medium shear dispersion equipment can be used for this purpose, such as a Cowles Dissolver. This equipment consists of a vertical driven shaft having a sawtooth impeller at its lower end. When rotated, the impeller will impart a high velocity to the mixture of fluid and pigment resulting in a shear condition. Other equipment such as a ball mill may also be employed with equal success as will readily occur to those skilled in the art.

The binder used in the coating formulation may be any one of a number of well-known resins conventionally employed for this purpose in the paint industry. Generally, the binder will be chosen from one of four groups: (1) reactive binders such as epoxy resins derived from bisphenol A and epichlorohydrin which are hardened with polyamines such as polyaminoamids, diethylene triamine, triethylene tetramine or coal tar amines; (2) air drying binders such as those derived by reaction from diglycidyl ether or bisphenol A and vegetable oil fatty acids; (3) solvent soluble binders which harden by solvent evaporation such as polyhydroxy ether or bisphenol A derived from bisphenol A and epichlorohydrin (Phenoxy PKHH); and (4) binders conventionally employed in moisture curable systems such as alkylo silicate prepared by hydrolysis or polymerization of tetraethyl silicate, alcohol and glycol. Typical polyaminoamide hardened epoxy resins that can be used as the binder are those sold under the trademark Epon 1001-CX75 (Shell Chemical) which is a condensation produce of epichlorhydrin and bisphenol A. This resin has an epoxide equivalent weight of 450–550 grams per gram equivalent of epoxide (ASTM D-1652) which is 75% solids in methylisobutyl ketone/xylene in a ratio 65/35. Suitable hardeners that may be employed with this resin are those sold under the trademark Versamid 415 (General Mills). These hardeners are reactive polyaminioamide resins based on polymerized vegetable fatty acids. They have an amine value of 230–246 mg. of KOH equivalent to basic nitrogen content in a one gram sample and a viscosity of about 31–38 poises at the 75° C. Typical epoxy ester resin binders for use in the air drying by oxidation systems are those sold under the trademark Epotuf 38-403 (Reichhold Chemical). Polymerized ethyl silicate is a good example of a suitable binder for use in the moisture curable binder system. Useful solvent soluble binders which dry by solvent evaporation are polydroxy ethers derived from bisphenol A and epichlorohydrin known as "phenoxy resins" sold by Union Carbide Corp.

Other suitable solvent soluble binders that can be employed in the coating formulation include, for example, high molecular weight epoxy resins, alkyd resins, polyesters, chlorinated rubber, and vinyl chloride-vinyl acetate copolymers with or without hydroxyl or carboxyl functionality.

The blend of manganomanganic oxide fume and zinc dust can be used in the coating formulation alone or together with other conventional color pigments, pigment extenders, fillers and corrosion inhibitors. For example, $Mn_3O_4$ fume can be employed together with conventional $TiO_2$, as well as various types of iron oxide pigments. Various pigment extenders may also be used such as talc, clays (hydrous aluminum silicate), diatomaceous silica and silica. Talc sold under the trademark Nytal 300 (RT Vanderbilt) is one example of a good pigment extender. In addition, other corrosion inhibitive pigments such as zinc chromate, for example, may also be employed.

A pigment suspension agent may also be employed. Typical suspension agents for use in the paint formulation are those sold under the trademark Bentone 27 (NL Industries) which is an organic derivative of hydrous magnesium aluminum silicate, Kelecin F (Spencer Kellogg), i.e., lecithin, and Nuosperse (Tenneco Chemical Co.).

The solvent used in the coating formulation may be any one of a variety of solvents and solvent mixtures conventionally employed in solvent base paints. Suitable solvents and solvent mixtures that can be used include, for example, ketones such as methylisobutylketone (MIBK), aromatics and mixtures of ketones and aromatics. Typical aromatic solvents that can be used are xylene and toluene. Another common aromatic solvent that can be used is SC-100 (Exxon) which is based on diethyl benzene. Other commercial solvents that can be employed include Cellosolve (ethylene glycol monoethylether) and Cellosolve Acetate (ethylene glycol monoethyletheracetate), both trademarks of Union Carbide Corp. Also in the case where the solvent soluble binder is an alkyd resin, petroleum distillate mineral spirits are generally used. Similarly, where the binder is a chlorinated rubber, both xylene and toluene are good solvents. Other suitable solvents for these binders include ketones and/or mixtures of ketones. Another solvent that may also be used is a blend which contains one third each of xylene, MIBK and Cellosolve.

The coating formulation may also include various other ingredients that are conventionally employed in solvent base paints of the prior art. For example, various additives may be employed to improve the film properties of the applied coating. Commercially available materials that may be used for this purpose include Beetle 216-8 (American Cyanamid) which is a urea resin-60% solution with Butanol/xylene; and ethyl alcohol which is recommended for use with the suspension agent Bentone 27. A viscosity controlling agent such as diatomaceous earth may also be employed in the paint formulation, i.e., Celite, a trademark of Johns-Manville. Other ingredients that may be employed include anti-gasing or water scavenging agents such as those sold under the trademark Syloid ZN-1 (W. R. Grace) which is a silica gel. Anti-skinning agents may also be used as Ex-Kin No. 2 (Tenneco Chemical Company).

EXAMPLES

Various embodiments of the invention are illustrated by the following specific examples which are set forth for the purpose of illustration and not limitation. All parts are by weight unless otherwise specified.

Seven formulations were prepared ranging from 100% zinc flake pigment to 100% Elkem Metals M-34 pigment (manganomanganic oxide, typically, the material has an analysis of 63–67% manganese, 2–3% iron and 24–26% oxygen, and is available from the Elkem Metals Co. of Pittsburgh, Pa.), holding the zinc/M-34 level constant at a 60 volume percent level. The total pigment volume concentration was held constant at 70 volume percent. Each formulation was thoroughly blended with a Premier "Dispersator" high shear mixer available from Avis Premier Mill Corp. of Temple, Pa., typically for about one hour in a steel container, such as a conventional paint can, to ensure that all of the ingredients were uniformly dispersed. During the dispersion process the temperature will rise to typically 50° C. The solids content of each formulation was measured and adjusted to 65 percent by weight. The viscosity of the formulations may need to be adjusted, depending upon the means of application. For an aerosol application a low viscosity will need to be used while a brush-on formulation may require a higher viscosity. Each formulation was then applied to Type R, Steel Q-Panel coupons (the Q-Panel Company of Cleveland, Ohio) measuring one inch by four inches (2.54 cm by 10.16 cm). The panels were cleaned prior to coating with DX 330 "Acrylic-Clean" Wax and Grease Remover available from PPG Industries, Inc., of Troy, Mich. The coatings were applied by an aerosol spray but could also be applied by brush coating, air or airless spraying. All coatings were allowed to air dry at room conditions for 24 hours. The dry coating thickness of these coatings were measured with a dial micrometer and found to be approximately 0.00254 cm.

TABLE I

| Formulation | 1 | 2 | 3 | 4 | 5 | 6 | 7 |
| --- | --- | --- | --- | --- | --- | --- | --- |
| Phenoxy PKHH, 20% in methyl ethyl ketone | 23.6 | 24.9 | 26.2 | 27.8 | 29.5 | 31.5 | 33.7 |
| Bentone SD-2 | 0.4 | 0.5 | 0.5 | 0.5 | 0.5 | 0.6 | 0.6 |
| Aerosil R-974 | 0.9 | 0.9 | 1.0 | 1.0 | 1.1 | 1.2 | 1.3 |
| Zinc flake ECKA MP 31129/G | 57.1 | 50.1 | 42.3 | 33.6 | 23.8 | 12.7 | — |
| M-34 pigment | — | 6.6 | 13.9 | 22.1 | 31.3 | 41.8 | 53.7 |
| Mica 325 mesh | 1.9 | 2.0 | 2.1 | 2.2 | 2.4 | 2.5 | 2.7 |
| Methyl ethyl ketone | 16.1 | 15.0 | 14.0 | 12.8 | 11.4 | 9.7 | 8.0 |

TEST METHODS

Weld-Through Properties

The weld-through properties of these coatings were evaluated using a DAN-MIG 140-195 MIG welder in the plug welding mode. Uncoated steel coupons were used in this evaluation as a control. A plug weld is a lap joint where the top member has a hole punched or drilled in the area of the overlap. This hole is then filled with weld metal which bonds the two members of the lap joint together. A 0.48 cm hole in the top member was used in this evaluation. Coated steel coupons were plug welded coating-to-coating at the mating surfaces. Eight plug welds were made using each weld-through coating formulation. Fourteen plug welds were made with uncoated steel. The following DAN-MIG 140-195 setting were used in the evaluation:

TABLE II

| Formulation | MIG Welder Settings | | |
|---|---|---|---|
| | Power | Wire Speed | Time |
| Uncoated steel | 5 | 5 | 6 |
| 1-4 | 5 | 5 | 6 |
| 5,6 | 5 | 5 | 7 |
| 7 | An arc could not be struck on this coating. | | |

The plug welds were subjectively rated "good" or "bad" based on a lack of weld defects such as porosity, blow holes, and improper fusion, and the mode of failure when the plug welded coupons were pulled apart. A "good" weld fails in a specific manner when pulled apart. A small piece of steel is pulled out of the bottom member of the lap joint and remains attached to the top member. This small piece of steel corresponds to the penetration of the plug weld into the bottom member of the lap joint. The percentage of "good" plug welds obtained per construction is shown below in Table III.

TABLE III

| Formulation | Percentage Of Good Welds | | |
|---|---|---|---|
| | Vol % Zn | Vol % M-34 | % Good Welds |
| 1 | 60 | — | 25 |
| 2 | 50 | 10 | 25 |
| 3 | 40 | 20 | 25 |
| 4 | 30 | 30 | 13 |
| 5 | 20 | 40 | 50 |
| 6 | 10 | 50 | 63 |
| Uncoated steel | — | — | 100 |

The data with respect to the coatings show a clear trend toward a higher percentage of "good" welds with decreasing zinc content, increasing M-34 pigment content. Plug welds could not be made with the 100% M-34 pigmented coating (sample formulation #7) because an arc could not be struck. A higher percentage of "good" plug welds also showed a reduction in zinc fume and burnback from the plug weld. The M-34 pigment melts at approximately 1550° C. This is in comparison to the 907° C. boiling point of zinc. We believe that the substitution of this high melting pigment for a portion of the zinc is largely responsible for this improvement in the properties of this modified zinc-rich coating relative to unmodified zinc-rich coatings.

A series of comparisons were made with commercially available zinc-rich coatings. Five commercially available weld-through coatings (Table IV) were evaluated against our preferred compositions. These commercially available weld-through coatings are organic, zinc-rich coatings marketed for use in resistance welding applications. Dan-Prime, weld-thru primer, zinc rich coating is also marketed for use in MIG welding. These coatings were evaluated for drying time, adhesion to steel, corrosion protection of steel in a salt spray cabinet, and weld-through characteristics for MIG welding.

TABLE IV

| Commercially Available Weld-Through Coatings | |
|---|---|
| Tradename | Supplier |
| Dan-Prime | Transnational Technology Enterprizes, Inc. |
| Panel Seal | Detroit Autobody Equipment Company |
| Spray Galv | Dyna-Flux Corporation |
| 9113 Zinc Spray | 3M Germany |
| Spot Weld Primer | Kent Industries |

Drying Time

The drying time at ambient room conditions of the six coatings was measured using the Gardner Drying Time Recorder (Table V). The wet coating thickness was not measured but probably varied due to the differing spray characteristics of the six aerosol coatings. All coatings were dry in under ten minutes.

TABLE V

| | Drying Time | |
|---|---|---|
| | Measured (min) | Claimed (min) |
| Example 4 | 7 | 10 |
| Dan-Prime | 9 | 5 |
| Panel Seal | 3 | 10 |
| Spray Galv | 3 | 5 |
| 9113 Zinc Spray | 7 | 5 |
| Spot Weld Prime | 6 | 10 |

Adhesion to Steel

The adhesion to steel of the six coatings was measured using ASTM D3359, Method B, Measuring Adhesion by Tape Test (Table VI). The coatings were applied to unsanded, Type R, Steel Q-Panels (cold rolled steel, SAE 1010 low carbon) at approximately 1.0 mil (0.0254 mm) dry coating thickness. The coatings were held seven days at ambient room conditions prior to testing. The adhesion to steel of the commercially available weld-through coatings was found to be slightly better than Example 4.

TABLE VI

| | Adhesion To Steel | |
|---|---|---|
| Coating | Adhesion Rating | Dry Coating Thickness (mm) |
| Example 4 | 4B | 0.0213 |
| Dan-Prime | 4B | 0.0284 |
| Panel Spray | 5B | 0.0255 |
| Spray Galv | 4.5B | 0.0257 |
| 9113 Zinc Spray | 5B | 0.0196 |
| Spot Weld Primer | 5B | 0.0257 |

Corrosion Protection of Steel in the Salt Spray Cabinet

The weld-through coatings were applied to unsanded, Type R, Q-Panels at approximately 0.0245 mm dry coating thickness. The coatings were held seven days at ambient room conditions prior to testing. The coated panels were scribed (0.49 mm × 100 mm) to expose bare steel and placed in the salt spray cabinet, ASTM B117, for twelve days (288 hours). The intact portion of the coatings were evaluated for Degree of Blistering, ASTM D714, and Degree of Rusting, ASTM D610, after twelve days in the salt spray cabinet (Table VII).

TABLE VII

| Coating | Size* | Density | Rust Rating** | Days to 10% Rust | Thickness (mm) |
|---|---|---|---|---|---|
| Example 4 | 6 | Med Dense | 10 | 4 | 0.0229 |
| Dan-Prime | 6 | Dense | 4 | <1 | 0.0279 |
| Panel Spray | 8 | Med Dense | 2 | <1 | 0.0264 |
| Spray Galv | 7 | Med Dense | 4 | <1 | 0.0259 |
| 9113 Zinc Spray | 8 | Med Dense | 4 | <1 | 0.0224 |
| Spot Weld | 8 | Dense | 5 | <1 | 0.0274 |

TABLE VII-continued

| Coating | Size* | Density | Rust Rating** | Days to 10% Rust | Thickness (mm) |
|---|---|---|---|---|---|
| Prime | | | | | |

*Size rated on a scale of 0–10 where a rating of 10 represents no blistering and a rating of 8 is the smallest size seen by an unaided eye.
**Rusting graded on a scale of 0–10 where a rating of 10 represents no rusting.

All coatings exhibited a medium to dense blistering of the intact coating after twelve days in the salt spray chamber. The coating of the invention (Example 4) and Dan-Prime exhibited medium sized blisters. The balance of the coatings exhibited from 3 to 10% rust-through of the intact coating. The coating of the invention (Example 4) required four days to reach a 10% rust level on the scribe-through of the coating showing superior sacrificial corrosion protection to steel as compared to the commercially available coatings. The remaining coatings exhibited a 10% rust on the scribe after a period of less than one day in salt spray chamber showing very little sacrificial corrosion protection.

Weld-Through Characteristics of MIG Welding

The weld-through coatings were evaluated for ease of welding-through and burnback from the weld nugget by making a series of spot welds on coated steel panels at various welder power/time settings and comparing these to uncoated steel. The weld nugget size of the coated steel was subtracted from the weld nugget size for uncoated steel yielding a weld-through number (WTN) per coating per welder power/time setting. The lower the weld-through number, the easier it is to weld-through the coating. A subjective evaluation of spatter level as compared to uncoated steel was also made as spattering also affects the ease of weld-through. Burnback from the weld nugget was determined by removing the coating ash from the weld zone and measuring the burnback of the coating from the weld nugget per coating per welder power/time setting. This data is contained in Table VIII. The weld-through coatings were applied to 21 gauge Type R, Steel Q-Panels at approximately 0.0254 mm dry coating thickness. A Dan-MIG 140-195 welder was used for this evaluation. A welder setting of power 5, wire speed 5, and a time of 5 was used as recommended by the manufacturer of MIG spot weld setting for 21 gauge steel. The settings were increased, incrementally, to the welders maximum setting of power 6, wire speed 6, and time 9.

TABLE VIII

Ease of Weld-Through, Spatter and Burnback (BB)

| | Welder Time: | | | | | |
|---|---|---|---|---|---|---|
| | 5 | | 7 | | 9 | |
| | WTN | BB | WTN | BB | WTN | BB |
| Welder Power 5, Wire Speed 5 | | | | | | |
| Example 4 | 1.5 | 1.5 | 1.0 | 1.5 | 1.5 | 1.5 |
| Dan-Prime | 3.5 | 1.5 | 3.0 | 3.0 | 3.0 | 3.0 |
| Panel Seal** | * | * | 3.0 | 3.5 | 3.5 | 4.5 |
| Spray Galv** | 2.0 | 4.0 | 2.0 | 5.0 | 1.5 | 6.0 |
| 9113 Zinc Spray | 2.5 | 2.0 | 2.0 | 3.0 | 2.0 | 3.0 |
| Spot Weld Prime | 2.0 | 2.5 | 2.0 | 3.0 | 2.0 | 3.5 |
| Welder Power 6, Wire Speed 6 | | | | | | |
| Example 4 | 1.5 | 1.5 | 1.0 | 1.5 | 1.0 | 1.5 |
| Dan-Prime | 2.0 | 2.5 | 1.5 | 3.5 | 2.0 | 3.0 |
| Panel Seal** | 6.0 | 3.0 | 5.0 | 3.5 | 2.0 | 4.5 |
| Spray Galv** | 2.5 | 5.0 | 2.0 | 6.0 | 1.5 | 7.0 |
| 9113 Zinc Spray | 2.0 | 3.0 | 1.5 | 3.5 | 1.0 | 4.5 |
| Spot Weld Prime | 3.0 | 3.0 | 1.5 | 3.5 | 1.0 | 3.5 |

Spatter

TABLE VIII-continued

Ease of Weld-Through, Spatter and Burnback (BB)

| Coating | Coating Thickness (mm) | Spatter Level |
|---|---|---|
| Example 4 | 0.0221 | low |
| Dan-Prime | 0.0295 | high |
| Panel Seal | 0.0259 | medium |
| Spray Galv | 0.0267 | medium |
| 9113 Zinc Spray | 0.0203 | high |
| Spot Weld Prime | 0.0267 | medium |
| Uncoated Steel | — | low |

*Panel Seal could not be welded-through at this setting.
**Blistering of the coating reached out to 8–10 mm from weld nugget.
The units in Table VII are mm.

Example 4 has the lowest weld-through number (WTN) at the welder setting recommended by the manufacturer for 21 gauge steel, power 5, wire speed 5, time 5. This demonstrates the coating used in accordance with the present invention is easier to weld-through than the commercially available coatings at the welder settings used for uncoated steel. This has a definite advantage for the operator since he does not have to make machine adjustments because of the presence of a coating on the welding surface. Panel Seal could not be welded-through at this setting. Coatings in accordance with the invention and Dan-Prime coating have the least amount of burnback from the weld nugget when using the recommended machine settings. This demonstrates that the coatings in accordance with the invention and Dan-Prime coating are superior to the balance of the coatings in remaining intact during the welding process, therefore, more of the weld zone is protected from corrosion. Spray Galv (and Panel Seal at higher settings) have the worst burnback performance. In addition, Spray Galv and Panel Seal blister out to 8–10 mm from the weld nugget. The coating in accordance with the present invention maintained its low weld-through number and low burnback over the range of welder settings evaluated showing a wide process window, showing that its optimum performance is independent of the welder setting over this range. This allows the operator greater flexibility in performing the weld.

Commercially available coatings have a very narrow process window. The optimum performance, with respect to weld-through number and burnback, is very dependent on the welder setting. This makes welding on these coatings very difficult. The coating in accordance with the present invention is also a low spatter coating very similar to welding on uncoated steel. The commercially available coatings are medium to high spatter coatings. The low spatter characteristic of the coating in accordance with the present invention is also an advantage in welding since spatter from the weld may damage surrounding surfaces, such as windshields and interior components of an automobile.

The weld-through coatings were also evaluated for their effect on weld strength by tensile testing of MIG plug welds with and without the test coatings at peak load. The plug weld process was previously described under weld-through properties.

TABLE IX

| Coating | Coating Thickness (mm) | Average Peak Load (lbs) | Standard Deviation |
|---|---|---|---|
| Example 4 | 0.0277 | 1689 | S = 338 |
| Dan-Prime | 0.0231 | 1846 | S = 83 |
| Panel Seal | 0.0257 | 1569 | S = 173 |
| Spray Galv | 0.0289 | 1790 | S = 137 |
| 9113 Zinc Spray | 0.0262 | 1947 | S = 53 |
| Spot Weld Prime | 0.0307 | 1870 | S = 69 |

TABLE IX-continued

| Coating | Coating Thickness (mm) | Average Peak Load (lbs) | Standard Deviation |
|---|---|---|---|
| Uncoated Steel | — | 1794 | S = 358 |

This data shows that coatings do not have an effect on the weld strength. In tensile testing, the metal surrounding the plug weld fails while the weld itself remains intact.

While this invention has been described in terms of specific embodiments, it should be understood that it is capable of further modifications. The claims herein are intended to cover those variations which one skilled in the art would recognize as the chemical equivalent of what has been described here.

I claim:

1. A method of welding metal parts, each of said parts having a surface area to be welded, said method comprising:
    (a) preparing the surface areas of said parts to be welded to provide bare metal surfaces which are clean and dry;
    (b) coating said bare metal surfaces with a protective coating comprising, zinc dust, manganomanganic oxide fume, and organic binder;
    (c) permitting the coating to dry at least to the touch to provide a coated surface;
    (d) contacting the coated surfaces of the metal parts to be welded; and
    (e) welding said metal parts together through said coated surfaces by means of gas metal arc welding to provide a welded joint bearing said protective coating.

2. The method of claim 1 wherein said protective coating comprises about 8 to about 90 parts by weight zinc dust, about 3 to about 55 parts by weight manganomanganic oxide fume, and about 2 to about 30 parts by weight organic binder.

3. The method of claim 1 wherein said protective coating comprises about 8 to about 45 parts by weight zinc dust, about 3 to about 40 parts by weight manganomanganic oxide fume and about 2 to about 25 parts by weight organic binder.

4. The method of claim 1 comprising the further steps of dressing said welded joint, if needed, and applying at least one additional coat of said protective coating over said welded joint.

* * * * *